(12) United States Patent
Nicastri et al.

(10) Patent No.: US 11,072,201 B2
(45) Date of Patent: Jul. 27, 2021

(54) FLANGED INNER RING OPTIMIZED FOR ORBITAL FORMING OPERATION AND ASSOCIATED TOOL

(71) Applicant: Aktiebolaget SKF, Gothenburg (SE)

(72) Inventors: Fulvio Nicastri, Garzigliana (IT); Fausto Morello, Sommariva del Bosco (IT)

(*) Notice: Subject to any disclaimer, the term of this patent is extended or adjusted under 35 U.S.C. 154(b) by 17 days.

(21) Appl. No.: 16/420,743

(22) Filed: May 23, 2019

(65) Prior Publication Data

US 2019/0375235 A1    Dec. 12, 2019

(30) Foreign Application Priority Data

Jun. 8, 2018 (IT) .................. 102018000006111
Jun. 8, 2018 (IT) .................. 102018000006112

(51) Int. Cl.
| | | |
|---|---|---|
| B60B 27/00 | (2006.01) | |
| F16C 19/18 | (2006.01) | |
| B21D 19/04 | (2006.01) | |
| F16C 33/58 | (2006.01) | |

(52) U.S. Cl.
CPC ........ B60B 27/0005 (2013.01); B21D 19/046 (2013.01); B60B 27/001 (2013.01); F16C 19/185 (2013.01); F16C 2226/52 (2013.01); F16C 2240/30 (2013.01); F16C 2240/40 (2013.01); F16C 2326/02 (2013.01)

(58) Field of Classification Search
CPC .. F16C 19/185; F16C 35/063; F16C 2326/02; F16C 33/583; F16C 2226/52; F16C 2240/30; F16C 19/196; B60B 27/0084; B60B 27/0094; B60B 2310/3412; B60B 27/0005; B60B 27/001; B21D 19/04

USPC ................. 384/538, 544, 548, 569
See application file for complete search history.

(56) References Cited

U.S. PATENT DOCUMENTS

| | | | |
|---|---|---|---|
| 5,822,859 A | 10/1998 | Kessen | |
| 6,113,279 A | 9/2000 | Sawai et al. | |
| 7,635,226 B2* | 12/2009 | Norimatsu | .......... B60B 27/0084 384/544 |

(Continued)

FOREIGN PATENT DOCUMENTS

| | | |
|---|---|---|
| EP | 1270268 | 1/2003 |
| EP | 1500460 | 1/2005 |

(Continued)

OTHER PUBLICATIONS

International Search Report for Italy Patent Application No. 102018000006111 dated Mar. 13, 2019.

(Continued)

*Primary Examiner* — Marcus Charles
(74) *Attorney, Agent, or Firm* — Reed Smith LLP

(57) ABSTRACT

Flanged inner ring of a rolling bearing forming part of a wheel hub unit of motor vehicles, having at its axially inner end a rolling edge configured to preload axially a radially inner ring after being plastically deformed by orbital forming. The rolling edge is provided with a conical surface of an axially inner portion of the rolling edge. A first parameter is defined as being the ratio between the conicity of the conical surface expressed in degrees and the thickness of the rolling edge expressed in millimeters and assumes values ranging between 0.03 mm$^{-1}$ and 2 mm$^{-1}$.

9 Claims, 4 Drawing Sheets

(56) References Cited

U.S. PATENT DOCUMENTS

| | | | |
|---|---|---|---|
| 2003/0063827 A1 | 4/2003 | Webb et al. | |
| 2005/0099058 A1* | 5/2005 | Suzuki | F16C 33/586 |
| | | | 301/105.1 |
| 2015/0010260 A1* | 1/2015 | Meeker | F16C 19/522 |
| | | | 384/544 |
| 2018/0149206 A1* | 5/2018 | Hagiwara | B21J 9/025 |

FOREIGN PATENT DOCUMENTS

| | | | | |
|---|---|---|---|---|
| EP | 1729021 | | 12/2006 | |
| EP | 2829755 A1 | * | 1/2015 | ............ F16C 33/723 |
| FR | 2931090 | | 11/2009 | |
| JP | H10196661 | | 7/1998 | |
| JP | 2003136160 A | * | 5/2003 | ............ F16C 35/063 |
| JP | 2005106215 | | 4/2005 | |
| JP | 2006021605 A | * | 1/2006 | ............. F16C 33/64 |
| JP | 2006349059 | | 12/2006 | |
| JP | 4042309 B2 | * | 2/2008 | ......... B60B 27/0084 |
| JP | 4513427 B2 | * | 7/2010 | .............. F16C 43/04 |
| JP | 4612521 B2 | * | 1/2011 | .............. F16C 43/04 |
| WO | WO-2005085665 A1 | * | 9/2005 | .............. B60B 27/00 |
| WO | WO-2016143871 A1 | * | 9/2016 | .............. F16C 35/06 |

OTHER PUBLICATIONS

International Search Report for Italy Patent Application No. 102018000006112 dated Mar. 1, 2019.

* cited by examiner

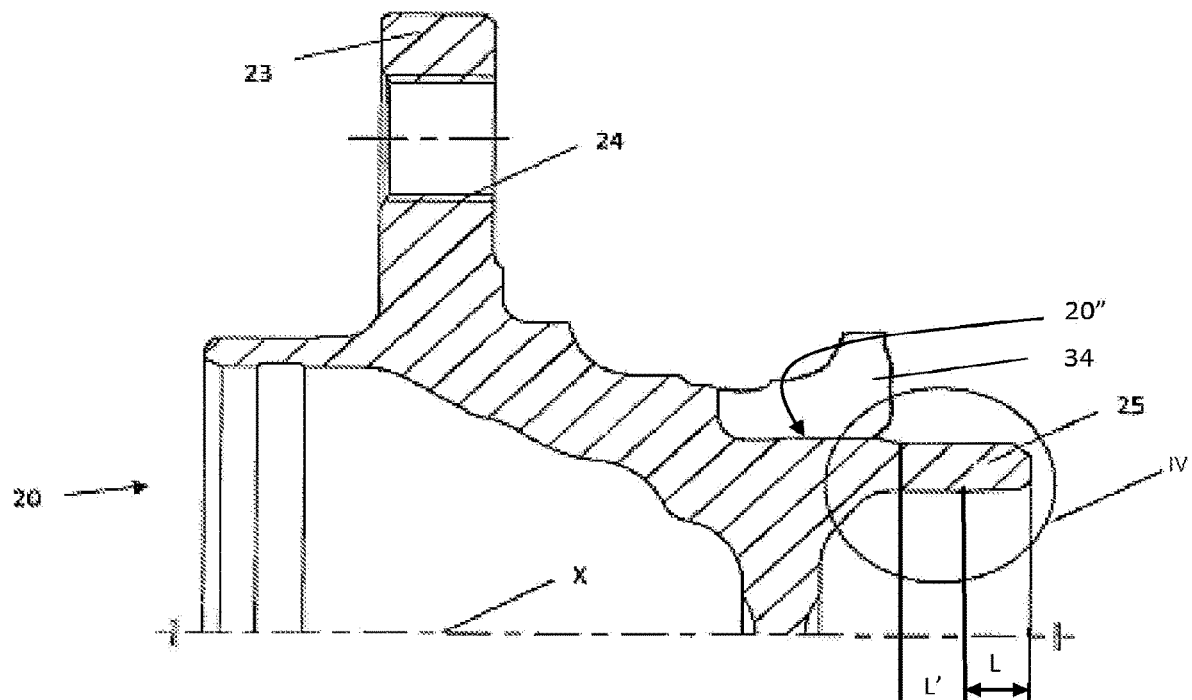
Fig. 3
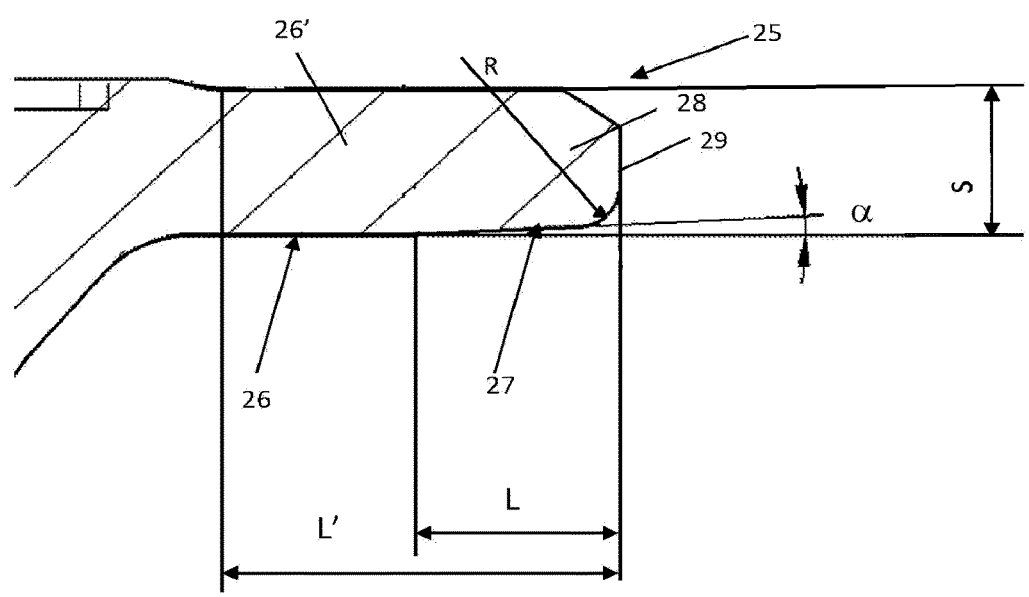
Fig. 4 – Detail IV

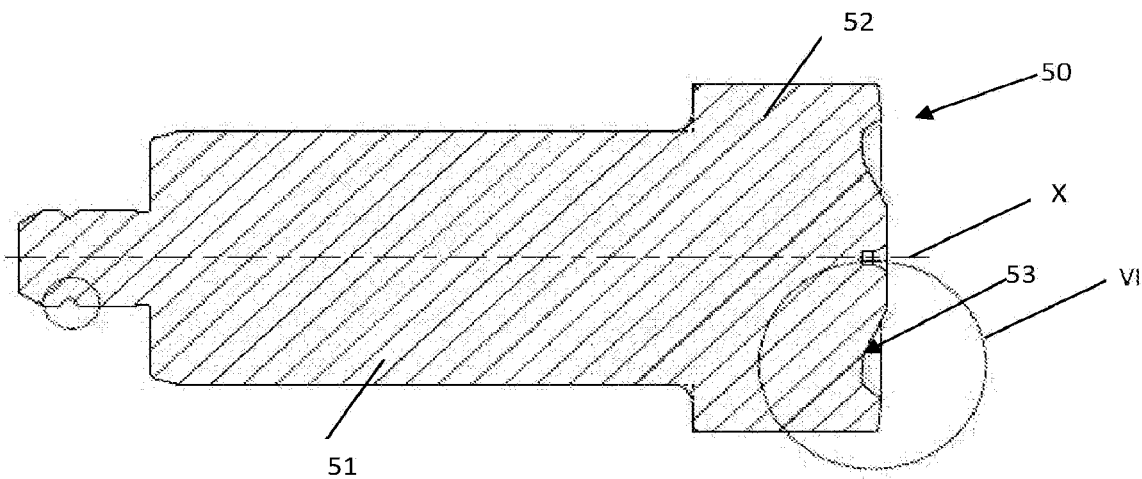
Fig. 5
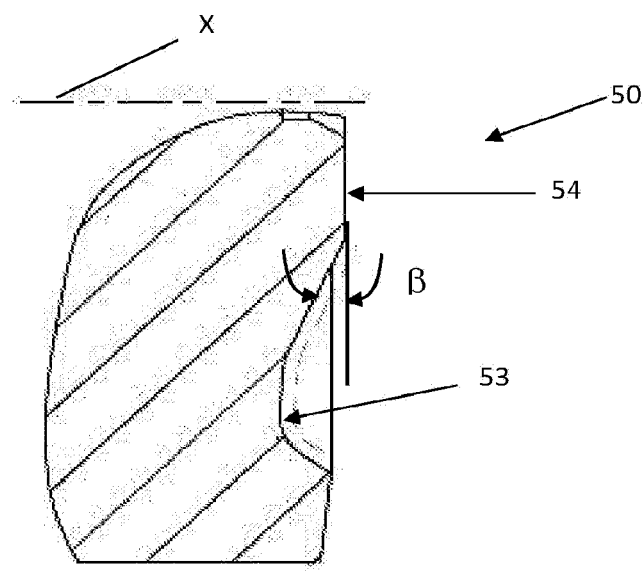
Fig. 6 - Detail VI

FLANGED INNER RING OPTIMIZED FOR ORBITAL FORMING OPERATION AND ASSOCIATED TOOL

CROSS-REFERENCE TO RELATED APPLICATIONS

This application claims priority to Italian patent application no. 102018000006111 filed on Jun. 8, 2018, and to Italian patent application no 102018000006112 filed on Jun. 8, 2018, the contents of which are both fully incorporated herein by reference.

FIELD OF THE INVENTION

The present invention relates to a flanged inner ring of a rolling bearing forming part of a wheel hub unit. The flanged inner ring, according to the present invention, has been optimized in order to improve the orbital forming operation and the invention also comprises a tool for performing this operation which has also been optimized in order to achieve the desired object.

The present invention is suitable in particular, although not exclusively, for the wheel hub units of motor vehicles, the units being provided with a rolling bearing. These applications comprise both the case where the outer ring of the bearing is rotating, while the inner ring of the bearing is fixed, and the opposite case where the inner ring rotates and the outer ring is fixed. The invention is also suitable for any type of rolling body (balls, rollers, tapered rollers, etc.).

BACKGROUND OF THE INVENTION

As is known and with reference to FIG. 1 which shows an example of a wheel hub unit 1 according to the prior art, in various applications of wheel hub units 1, the hub 2 has a cylindrical body 3 and an axially outer flange portion 4 for connection to the hub. The hub forms one of the rotating elements of the bearing unit and is configured to assume also the function of an inner rolling ring of the bearing. For these reasons, such a hub is also called a flanged inner ring and during the course of the present description it will be referred to in either of these two ways.

Normally, the bearing units of a wheel hub unit are provided with two rows 5, 6 of rolling bodies. These bodies roll along respective raceways 7' of an outer ring, which in most cases is stationary, and along respective raceways 2', 8' of the inner rings, which in most cases are rotating.

As mentioned, the hub assumes the function of an inner ring, in an axially outer position, while a second inner ring 8, which is separate from the hub, is mounted on the same hub and in particular on a radially outer surface 2'' thereof.

The hub 2 defines at its axially inner end a rolled edge 9 which is configured to preload axially the inner ring 8, after it has been deformed by means of a plastic machining operation, called orbital forming. The rolled edge 9 is shown in the undeformed configuration, in continuous lines, and in the deformed configuration, in broken lines.

The orbital forming operation is performed by means of a tool, schematically shown in FIG. 1 and denoted overall by 100, which has a cylindrical body 101, an annular press portion 102 with pressing surface 103 which has an opening angle $\gamma$, formed between the pressing surface 103 and a flat surface 104 of the tool 100, which is radially inner with respect to the pressing surface 103, the angle assuming values close to 90° and in any case greater than 45°.

Once the orbital forming operation has been performed, the radially outer diameter DK of the inner ring 8 increases significantly in size precisely because of the machining operation. In fact, in order for the desired deformation of the edge and the consequent preloading of the inner ring 8 to be performed, the press tool must exert on the rolled edge of the hub or flanged inner ring a very high load and this naturally has an impact both on the tensioned state and on the deformation of the inner ring 8 and consequently on the dimensions of its diameter DK which tend therefore to increase.

There exists therefore the need to design a flanged inner ring of a wheel hub unit and the associated tool for performing orbital forming which avoid the aforementioned drawbacks. In particular, there exists the need to reduce the amount of force needed to obtain deformation of the rolled edge 9 of the flanged inner ring 2 and consequently obtain a smaller degree of deformation of the inner ring 8.

BRIEF SUMMARY OF THE INVENTION

The object of the present invention is to provide a flanged inner ring and an orbital forming tool for reducing the deformation of the small inner ring of the bearing unit of a wheel hub unit, the deformation being induced by the orbital forming process carried out on the rolling edge of the flanged inner ring thereof.

Another object of the present invention is that of achieving a reduction of the rolling force needed to deform the rolling edge of the flanged inner ring.

The proposed solution envisages on the one hand optimization of the form of the inner hole along the rolling edge of the flanged inner ring and, on the other hand, a consequent optimization of the pressing surface of the tool which performs the orbital forming process. By means of these two optimization measures it is possible to reduce the amount of energy needed for the plastic deformation and the percentage increase in the radial outer diameter of the small inner ring, namely its overall deformation.

Therefore, according to the present invention a flanged ring of a wheel hub unit provided with a rolling edge optimized for the conical orbital forming operation is described, the flanged ring having the characteristic features indicated in the independent product claim attached to the present description.

Furthermore, still according to the present invention, a tool for the orbital forming operation having the characteristic features illustrated in the independent apparatus claim attached to the present description is described.

Further preferred and/or particularly advantageous embodiments of the invention are described in accordance with the characteristic features indicated in the attached dependent claims.

BRIEF DESCRIPTION OF THE SEVERAL VIEWS OF THE DRAWING

The invention will now be described with reference to the attached drawings which illustrate a number of non-limiting examples of embodiment thereof, in which:

FIG. 3 shows an axial-symmetric cross-sectional view of a flanged inner ring according to an embodiment of the present invention, before the orbital forming operation;

FIG. 4 shows a detail of the rolling edge of the flanged ring according to detail IV of FIG. 3;

FIG. 5 shows a cross-sectional view of the orbital forming tool according to an embodiment of the present invention; and FIG. 6 is a detail of the geometry of the tool according to detail VI of FIG. 5.

DETAILED DESCRIPTION OF THE INVENTION

Figure 1:
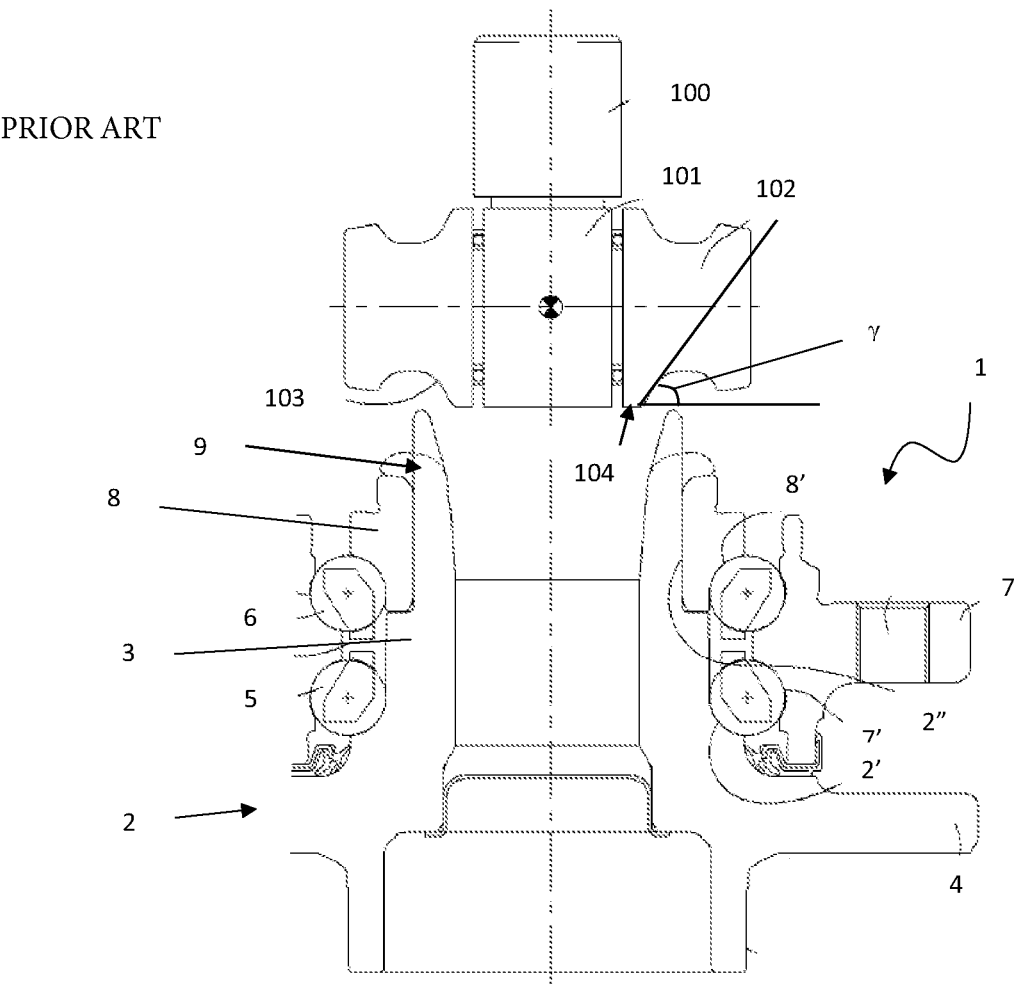
FIG. 1 shows a partial axial-symmetric cross-sectional view of the operation of orbital forming of a flanged inner ring according to the prior art.
Figure 2:
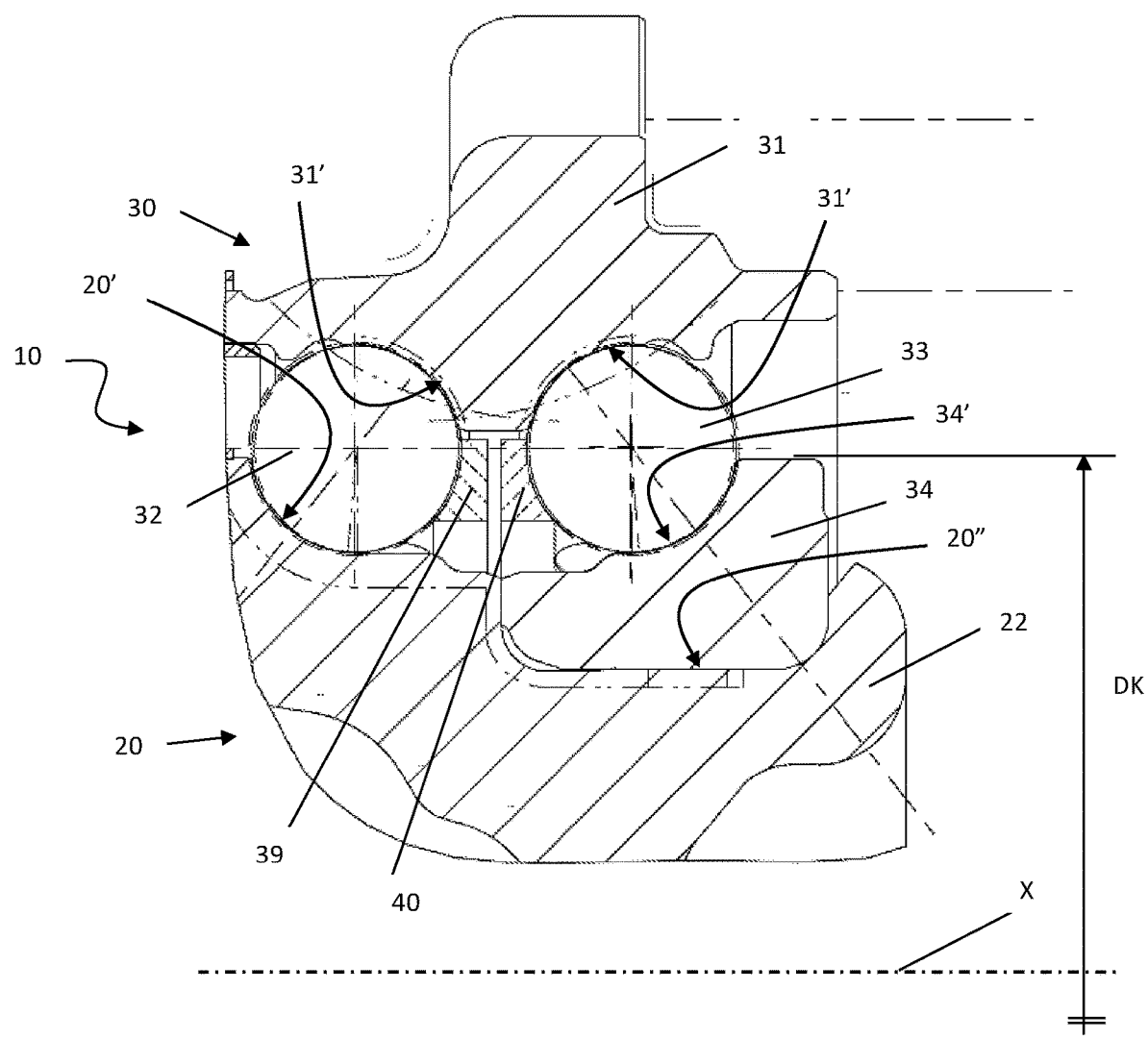
FIG. 2 shows a partial axial-symmetric cross-sectional view of a detail of an assembled wheel hub unit, after completion of the orbital forming operation according to an embodiment of the present invention.

With reference now to FIG. 2, a wheel hub unit according to a preferred embodiment of the invention is denoted overall by 10. The figure shows a detail of the configuration provided by way of example. As mentioned in the introduction, the invention is applicable not only to the configuration described below, but more generally to any wheel hub unit for motor vehicles.

The unit 10 comprises a hub 20 which is preferably, but not necessarily, rotatable and a bearing unit 30. The hub 20 is configured to assume also the function of an inner rolling ring of the bearing and, for this reason, is also called flanged inner ring. In the whole of the present description and the claims, the terms and expressions indicating positions and orientations such as "radial" and "axial" are understood as referring to the central axis of rotation X of the bearing unit 30. Expressions such as "axially outer" and "axially inner" refer instead to the assembled condition and, in the case in question, preferably refer to a wheel side and, respectively, to a side opposite side to the wheel side.

The bearing unit 30 comprises a radially outer ring 31 which is preferably, but not necessarily, stationary and provided with respective radially outer raceways 31', at least one radially inner ring 20, 34 which is rotatable and provided with respective radially inner raceways 20', 34' and two rows of rolling bodies 32, 33, in this example balls. The row of axially outer rolling bodies 32 is arranged between the radially outer ring 31 and the hub 20 with the function of a radially inner ring, while the row of axially inner rolling bodies 33 is arranged between the radially outer ring 31 and the radially inner ring 34. For the sake of easier illustration, the reference numbers 32, 33 will be used to identify both the single balls and the rows of balls. Again, for the sake of simplicity, the term "ball" may be used by way of example in the present description and in the attached drawings instead of the more generic term "rolling body" (and likewise the same reference numbers will also be used). It will be understood always that, instead of balls, any other rolling body (for example, rollers, tapered rollers, needle rollers, etc.) may be used.

The rolling bodies of the rows 32, 33 are kept in position by corresponding cages 39, 40.

The hub 20 defines, at its axially inner end, a rolled edge 22 which is configured to preload axially the inner ring 34 which is mounted on a radially outer surface 20" of the hub.

With reference to FIG. 3 the hub 20 also has an axially outer flange portion 23. The flange portion has a plurality of axial fixing holes 24. These holes are the seats for corresponding fixing means (for example stud bolts, also of the known type) which connect in a known manner a part of the motor vehicle wheel, for example the brake disc (also known per se and not shown in the figures), to the hub 20.

FIG. 3 also shows the rolling edge 25 in the undeformed configuration, namely before undergoing the orbital forming operation. For greater clarity, in the present description the expression "rolling edge 25" is used to indicate the axially inner edge of the flanged ring 20 in the undeformed configuration, while the expression "rolled edge 22" is used to indicate the same edge in the deformed configuration, namely after undergoing the orbital forming operation.

FIG. 4 is a detail IV of FIG. 3. This figure shows, on a larger scale, the rolling edge 25. According to a preferred embodiment of the invention and in order to achieve predefined objects of the invention—namely a smaller increase in the outer diameter DK of the radially inner ring 34 as a result of the deformation induced by the rolled edge 22 and a smaller rolling force—this rolling edge 25 has been optimized.

The rolling edge 25 is bounded radially outwardly by a mounting surface 20", on which the ring 34 is mounted, and is bounded radially inwardly by a conical surface 27 which, widening outwards from an inner hole 26 of the hub 20, causes a gradual thinning of a radial thickness of the rolling edge 25. The conicity of the conical surface 27 allows, firstly, the rolling edge 25 to be deformed starting from sections with a smaller radial thickness, which are therefore more malleable, namely can be machined more easily by means of cold-deformation, and gradually reaching sections with a larger radial thickness, therefore also allowing an axial thrust along the axis X of the forming tool to be divided essentially into two components:

a direct radial component Cr perpendicular to the axis X and a direct axial component Ca along the axis X.

Both the components Cr and Ca are influenced during a first approximation by the value of the angle $\alpha$ (shown in FIG. 4) of inclination of the conicity of the conical surface 27 on which the forming tool acts, and the axial component Ca acts on the rolling edge 25, favoring the deformation thereof and controlling the deformations of the radially inner ring 34.

In fact, owing to the conical form, during the orbital forming process, the deformation of the rolling edge will proceed, starting from the end sections, i.e. those with a smaller size radial thickness, and gradually reaching the sections with a larger radial thickness. This favors the flow of material from the undeformed position into the final deformed configuration of the rolling edge. In other words, by reducing the value of the total thrust, the same quantity of material will be in contact with the radial inner ring, performing the function of retaining and preloading the ring, without deforming it excessively.

Obviously, these conditions will vary with a variation of the amount of material to be deformed. Moreover, the value of the conicity may not assume any value: a high conicity would increase the axial thrust component, favoring the process described above, but would weaken the rolling edge excessively. On the other hand, a low conicity value would result in a very strong rolling edge being obtained, but would reduce the axial thrust component, thus neutralizing the beneficial effects which are sought after. In the light of the above compromise it is required to select suitable ranges for the main geometric parameters of the rolling edge. The predefined aim is that of reducing, without weakening excessively the rolling edge, the increase in the diameter DK of the radially inner ring 34 by percentage amounts of between 25% and 35% depending on the applications.

After carrying out extensive tests in order to verify the considerations highlighted above, the Applicant has found that the best results for optimizing the deformation of the radially inner ring and the force to be applied to the tool for the orbital forming operation are obtained by selecting suitable values of two parameters.

A first parameter k is defined as being the quotient between the conicity α of the surface 27 expressed in degrees and the radial thickness s of the cylindrical portion 26' of the rolling edge expressed in millimeters:

$$k=\alpha/s$$

in particular, the parameter k may assume values of between $0.03°$ $mm^{-1}$ and $2°$ $mm^{-1}$. Considering that a standard value of the thickness for a rolling edge is equal to 5 mm and that the variation range of the thickness is between 3 mm and 7 mm, a value beyond which the orbital forming process would be very difficult to perform, it emerges that the value of the conicity must lie in a range of between $0.2°$ and $6°$. It is essential that this parameter be complied with in order to avoid excessive weakening of the end section of the rolling edge 25 which has a smaller radial thickness.

Advantageously, a second parameter h is defined as being the quotient between the conicity α of the surface 27 expressed in degrees and length L' of the rolling edge 25, namely the depth of the hole 26, expressed in millimeters:

$$h=\alpha/L'$$

in particular, the parameter h may assume values of between $0.25°$ $mm^{-1}$ and $0.5°$ $mm^{-1}$. Considering that a standard value of the length L' is equal to 11 mm and that the variation range of the length L' may be between 8 mm and 16 mm, it emerges that the value of the conicity must lie between $2°$ and $4°$. By complying with this second parameter h it is possible to achieve a further advantage, namely that of ensuring that the rolling edge 25 has a minimal length of the cylindrical portion 26'.

The length L of the conical surface 27 of the axially inner portion 28 is also correlated to the thickness s of the rolling edge 25 and to its length L'. Considering that, as already mentioned, the variation range of the length L' is between 8 mm and 16 mm, the length L of the conical surface 27 may range between 5 mm and 8 mm. Advantageously, better results are obtained if the value of this length L is between 6 mm and 7 mm.

Finally, the fillet radius R between the conical surface 27 and the axially inner flat surface 29 of the rolling edge 25 must assume a value of between 0.5 mm and 2.5 mm. Advantageously, better results are obtained if the value of this fillet radius R is approximately equal to 1.5 mm.

An example of the dimensions of the rolling edge is as follows: thickness s equal to 5 mm, length L' of the rolling edge equal to 11 mm, conicity α equal to about $3°$, length L of the conical surface 27 of the axially inner portion 28 equal to about 6.5 mm and the fillet radius R equal to 1.5 mm.

The objects of the present invention are achieved while also optimizing the tool to be used for the orbital forming operation.

With reference to FIGS. 5 and 6, where FIG. 6 is the detail VI on a larger scale of FIG. 5, the orbital forming operation is performed by means of a tool—schematically shown in FIG. 5 and denoted overall by 50—which has a cylindrical body 51 and an annular press portion 52 with a pressing surface 53 which is also annular. In the detail of FIG. 6 it is easy to identify the opening angle β between the pressing surface 53 and a flat surface 54 radially internal to the pressing surface 53. The value of the opening angle β has been optimized with respect to those values normally employed in the prior art.

The modified profile of the orbital forming tool, in particular during the initial deformation phase, has the effect of increasing the compression and reducing the radial expansion of the diameter DK of the radially inner ring 34, in turn induced by the radial deformation which the tool causes on the rolling edge 25 of the flanged inner ring 20. The series of tests already mentioned resulted in suitable optimization of the opening angle β of the tool which must be between $5°$ and $40°$ in relation to the flat surface 54 of the tool.

All of the dimensional optimizations, described above, and modifications result in a greater deformability of the rolling edge 25 with all the advantages described below.

Firstly, the reduction in the force required for the orbital forming operation in order to obtain the rolled edge 22. In this way it is not necessary to use orbital forming machines with high performance features, even when a very high load will be required, for example higher than 240 kN. Consequently, for the same application, the power consumption during use of the orbital forming machine will also be reduced, On the other hand, for the same force applied, an increase in the retention force of the deformed material of the rolled edge on the radially inner ring 34 is obtained.

Furthermore, the increase in the diameter DK of the radially inner ring 34 is reduced from 25% to 35% depending on the applications. Consequently, the tensioned state of the radially inner ring is also reduced. This allows better assembly of the seal and a reduction in the formation of fissures in the radially inner ring.

As regards the tool, its geometry is simplified with a consequent increase in the working life of the tool and reduction in costs. Moreover, bigger tolerances will be possible as regards initial contact of the tool with the respective contact portion of the rolling edge, with a consequent further reduction in the cost of the tool.

In addition to the embodiments of the invention, as described above, it is to be understood that numerous further variants exist. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A flanged inner ring of a rolling bearing for a wheel hub unit used for motor vehicles, the flanged inner ring comprising:
    a rolling edge at its axially inner end configured to axially preload a radially inner ring after being plastically deformed by means of an orbital forming, wherein
    the rolling edge comprises a conical surface of an axially internal portion of the rolling edge, and wherein
    a first parameter that is defined as the quotient between the conicity (α) of the conical surface, expressed in degrees, and the thickness (s) of the rolling edge, expressed in millimeter, is in a range between $0.03°$ $mm^{-1}$ and $2°$ $mm^{-1}$.

2. The flanged inner ring according to claim 1, wherein the conicity (α) of the conical surface is in a range between $0.2°$ and $6°$.

3. The flanged inner ring according to claim 1, wherein a second parameter (h) which is defined as the quotient between the conicity (α) of the conical surface, expressed in degrees, and the length (L) of the rolling edge, expressed in millimeters, is in a range between 0.125° mm$^{-1}$ and 0.5° mm$^{-1}$.

4. The flanged inner ring according to claim 3, wherein the conicity ($\alpha$) is comprised between 2° and 4°.

5. The flanged inner ring according to claim 1, wherein the length (L) of the conical surface of the axially internal portion is between 5 mm and 8 mm.

6. The flanged inner ring according to claim 5, wherein the length (L) is between 6 mm and 7 mm.

7. The flanged inner ring according to claim 1, wherein a fillet radius (R) between the conical surface and an axially inner plane surface of the rolling edge has a length between 0.5 mm and 2.5 mm.

8. The flanged inner ring according to claim 7, wherein the length of the fillet radius (R) is approximately equal to 1.5 mm.

9. A wheel hub unit for motor vehicles, comprising a flanged inner ring provided with a radially inner raceway and a bearing unit, the bearing unit comprising:

a radially outer ring provided with respective radially outer raceways, a radially inner ring provided with a radially inner raceway, a plurality of rolling bodies positioned between the respective internal and external raceways, and a rolling edge at its axially inner end configured to axially preload a radially inner ring after being plastically deformed by means of an orbital forming, wherein the rolling edge comprises a conical surface of an axially internal portion of the rolling edge, and wherein a first parameter that is defined as the quotient between the conicity ($\alpha$) of the conical surface, expressed in degrees, and the thickness (s) of the rolling edge, expressed in millimeter, is in a range between 0.03° mm$^{-1}$ and 2° mm$^{-1}$.

\* \* \* \* \*